(12) United States Patent
Turk

(10) Patent No.: US 8,161,501 B2
(45) Date of Patent: Apr. 17, 2012

(54) APPARATUS, METHOD AND COMPUTER PROGRAM PRODUCT FOR FACILITATING THE INTEROPERABILITY OF VIRTUAL MACHINES

(75) Inventor: Mladen Turk, Zagreb (HR)

(73) Assignee: Red Hat, Inc., Raleigh, NC (US)

( * ) Notice: Subject to any disclaimer, the term of this patent is extended or adjusted under 35 U.S.C. 154(b) by 1115 days.

(21) Appl. No.: 11/621,552

(22) Filed: Jan. 9, 2007

(65) Prior Publication Data

US 2007/0174853 A1    Jul. 26, 2007

Related U.S. Application Data

(60) Provisional application No. 60/757,245, filed on Jan. 9, 2006.

(51) Int. Cl.
*G06F 9/46* (2006.01)
*G06F 9/455* (2006.01)

(52) U.S. Cl. .............................. 719/330; 719/319; 718/1

(58) Field of Classification Search .................. None
See application file for complete search history.

(56) References Cited

U.S. PATENT DOCUMENTS

| | | | |
|---|---|---|---|
| 6,862,735 B1 * | 3/2005 | Slaughter et al. | 719/315 |
| 2002/0107890 A1 * | 8/2002 | Gao et al. | 707/513 |
| 2003/0101334 A1 * | 5/2003 | Desoli | 712/227 |
| 2004/0025158 A1 * | 2/2004 | Traut | 718/1 |
| 2005/0055698 A1 * | 3/2005 | Sasaki et al. | 719/310 |
| 2005/0198487 A1 * | 9/2005 | Zimmer et al. | 713/2 |
| 2005/0204342 A1 * | 9/2005 | Broussard | 717/124 |
| 2005/0251802 A1 * | 11/2005 | Bozek et al. | 718/1 |
| 2006/0037032 A1 * | 2/2006 | Synovic et al. | 719/330 |

* cited by examiner

*Primary Examiner* — Andy Ho
*Assistant Examiner* — Tuan Dao
(74) *Attorney, Agent, or Firm* — Lowenstein Sandler PC

(57) ABSTRACT

Embodiments of this invention concern an apparatus, method and computer program product for managing the interoperability between objects in multiple virtual machines that are written to support different languages, such as .NET and Java. In particular, objects or programs running inside a virtual machine are allowed to create, control, and destroy objects running inside a separate virtual machine. The virtual machines interoperate using a proxy mechanism that utilizes function calls, rather than data passing, to run and access the desired objects.

22 Claims, 3 Drawing Sheets

APPARATUS, METHOD AND COMPUTER PROGRAM PRODUCT FOR FACILITATING THE INTEROPERABILITY OF VIRTUAL MACHINES

CROSS REFERENCE TO RELATED APPLICATION

This application claims benefit from U.S. Provisional Patent Application No. 60/757,245, filed Jan. 9, 2006.

DESCRIPTION OF TILE INVENTION

1. Field of the Invention

Embodiments of the present invention relate generally to a computer software system for managing the interoperability of objects between a plurality of distinct virtual machines.

2. Background of the Invention

The release by Sun Microsystems in 1994 of the Java programming language marked the first wide scale release of a software system based upon virtual machines. The virtual machine abstracted much of the details of the underlying operating system. Java software is compiled into a bytecode format, which is compiled into machine code of the local machine at runtime. These features allowed for easy portability of programs written in Java between computers running different operating systems.

However, it also made the task of interacting with other software written for that operating system more difficult. The primary method that Java provided for interacting with software running outside its virtual machine was through a function called the Java Native Interface (JNI). JNI allows a Java program running inside the Java Virtual Machine (JVM) to access any resources on the local machine by utilizing standard operating system facilities.

The success of the Java programming language spawned other languages utilizing the virtual machine model. The most widely used of these competitors is the .NET Framework written by Microsoft Corporation. The .NET framework also allows for programs to be written in multiple Microsoft programming environments that are compiled into a shared bytecode format. This bytecode is then interpreted by the .NET virtual machine and any actions are executed.

Both .NET and Java are also object oriented programming languages. In order to form fully function programs, a programmer writes objects and then assembles objects together. Unfortunately, even though both .NET and Java are objected oriented languages that use virtual machine systems, the objects created in each cannot be directly used in the other virtual machine. That is, objects in .NET and Java are not interoperable with each other. Thus, programmers must write objects for use in .NET and Java separately. Providing support for objects across multiple languages is well known to be difficult and expensive.

Some development has taken place to write a common virtual machine for both languages. However, such an implementation may not be supported by either Sun or Microsoft. Because of its lack of support, this dual virtual machine has significant performance and stability issues. Furthermore, the task of fully implementing a virtual machine to handle both programming languages is a very expansive task because of the need to completely handle the specification of both programming languages and their differences.

Another option for sharing objects created in one virtual machine with the other virtual machine is through the use of intermediary proxies. With this technique, both virtual machines run concurrently, with the proxies handling details of the object management for the opposing virtual machine. This management of objects between the virtual machines was generally accomplished through the use of a third system that was already known by both virtual machines.

For example, a heavy-weight Common Object Request Broker Architecture (CORBA) proxy was created to handle the creation, modification, and destruction of objects on the opposing virtual machine. The proxy format utilized by this third system, however, had significant drawbacks. The virtual machines had to translate their data into the CORBA format for communication with the other virtual machine. In addition, the stability and performance of the CORBA framework limited the use of this proxy.

Therefore, there exists a need for a software system that allows for easy, efficient interoperability between implementations of object oriented, virtual machine languages, such as .NET and Java. There also is a need for implementing an improved proxy, such as a lightweight and/or stable proxy, that allows the use of objects written for one type of virtual machine to be utilized by a software program running in a different type of virtual machine.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention may be implemented using well known components. For example, embodiments of the present invention may be implemented on a computing device or system, such as a personal computer, server, workstation, mobile device, terminal, etc., having a process, a memory, storage, etc. One skilled in the art will also recognize that the device implementing the present invention may comprise an operating system, such as the LINUX operating system, the Microsoft™ Windows operating system, and the like, which supports the operations of objects and virtual machines, such as those for .NET and Java applications. Furthermore, the device may be implemented with various other peripheral devices, such as a display, one or more speakers, a keyboard, a mouse, and the like.

Figure 1:
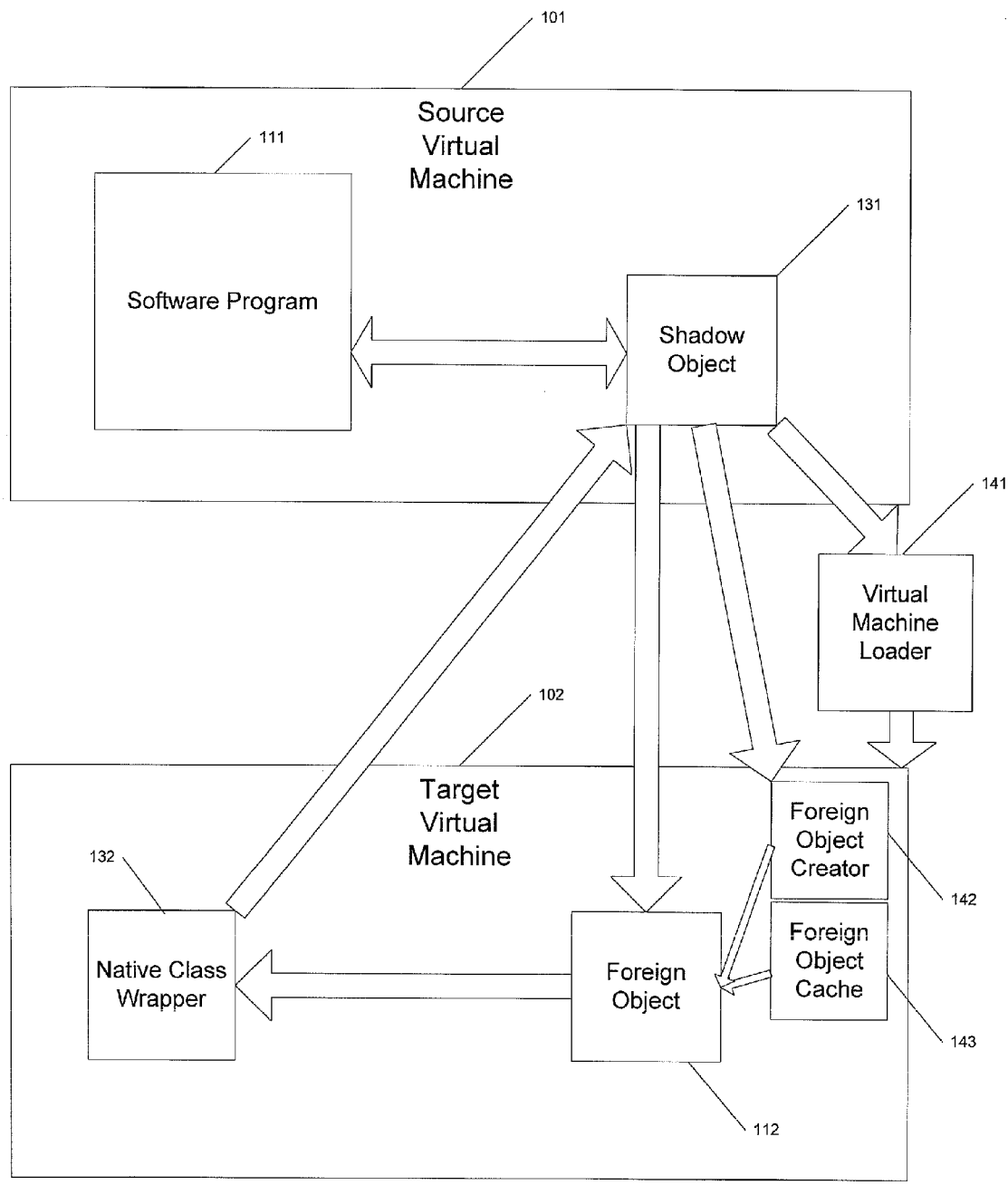
FIG. 1 illustrates two interoperable virtual machines and the interaction of the corresponding objects in those virtual machines according to one embodiment of the present invention.
Figure 2:
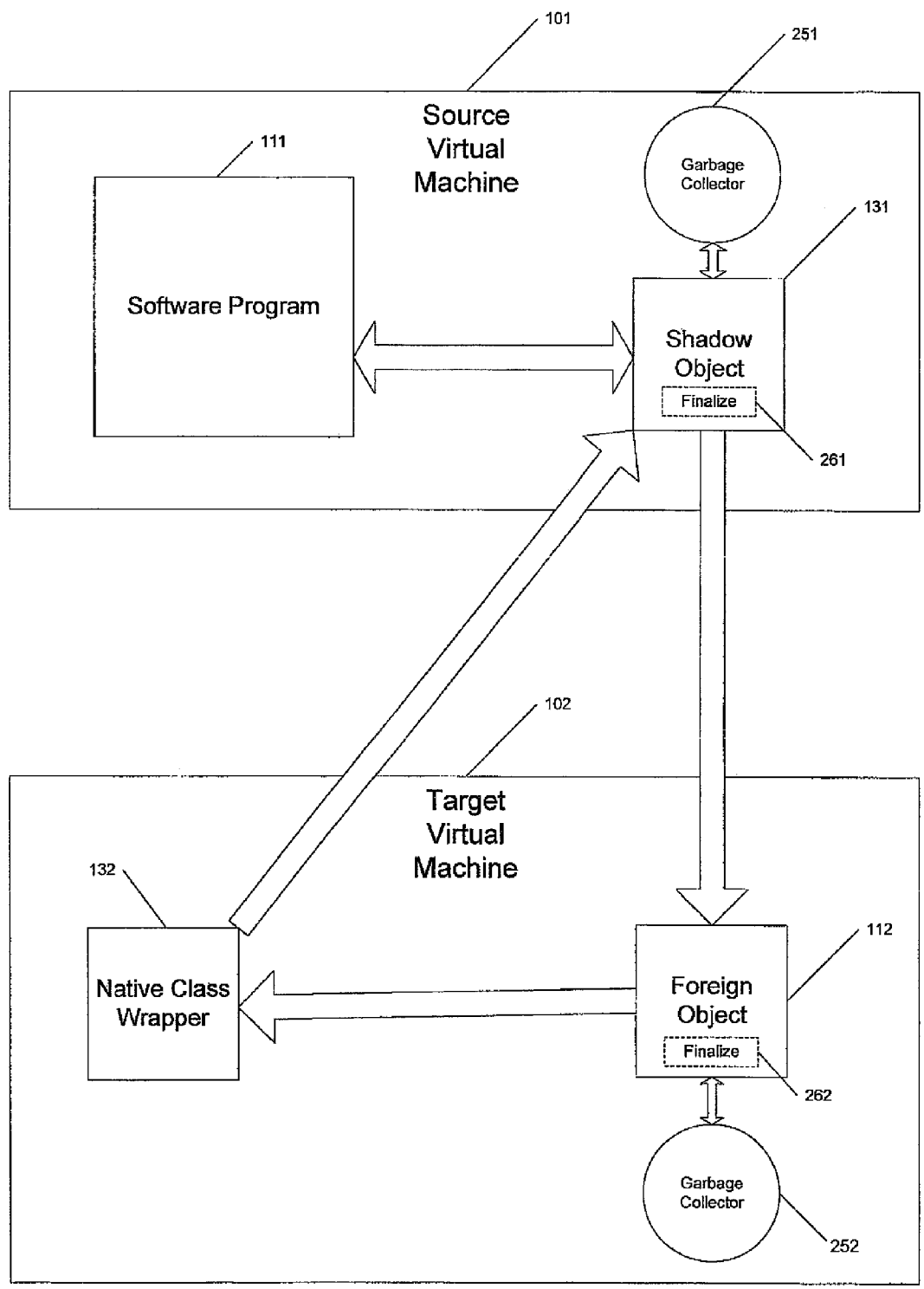
FIG. 2 illustrates the handling of garbage collection of interoperating objects according to one embodiment of the present invention.
Figure 3:
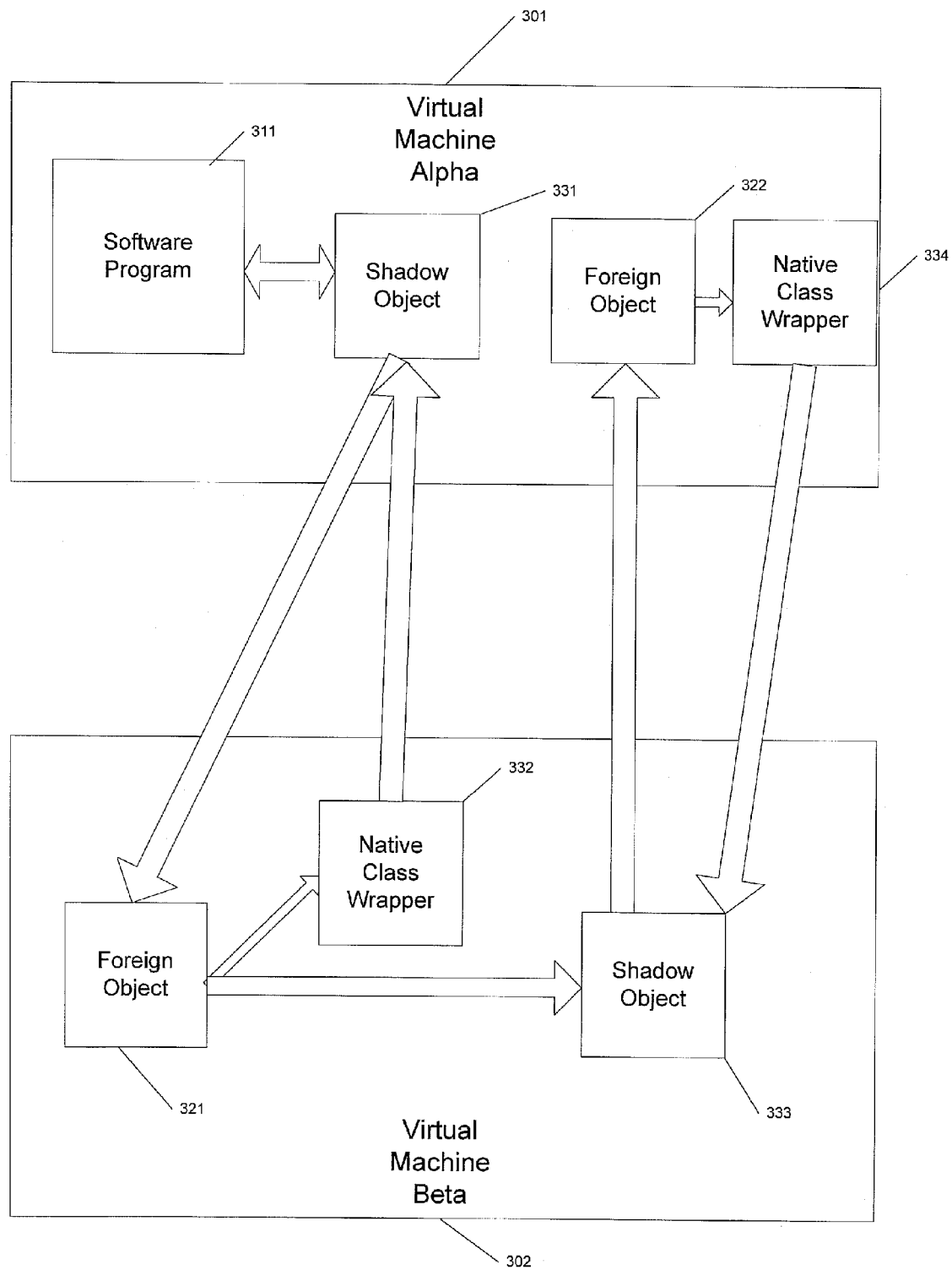
FIG. 3 illustrates the chaining of interoperable objects between virtual machines according to one embodiment of the present invention.

Reference will now be made in detail to the exemplary embodiments of the invention, which are illustrated in the accompanying drawings. Wherever possible, the same reference numbers will be used throughout the drawings to refer to the same or like parts. FIG. 1 illustrates two interoperable virtual machines and the interaction of the corresponding objects in those virtual machines. FIG. 2 illustrates the handling of garbage collection of interoperating objects. FIG. 3 illustrates the chaining of interoperable objects between virtual machines. These figures will now be described in more detail.

FIG. 1 illustrates a source virtual machine 101 that is interoperable with objects in a target virtual machine 102. One skilled in the art will recognize that virtual machines 101 may be implemented on the same device or on different devices coupled together across a network. The designation of virtual machines 101 and 102 as a "source" or "target" is merely a relative designation. For example, the source virtual machine 101 may contain a software program 111 written in Java, which is trying to utilize a foreign object 112 that is written in a different language, such as .NET, in the target virtual machine 102.

A source virtual machine contains a software program 111 or object that is attempting to access another object, such as object 112, which is foreign to the virtual machine (i.e., a virtual machine supporting different language). The software program 111 is the executable code trying to access the foreign object 112. The software program 111 could be any code running within the virtual machine 101, including software comprising one or more objects itself. In addition, the software program 111 can be, itself, a foreign object being accessed from another virtual machine. A target virtual machine contains the foreign object, which is being called by the source virtual machine.

In order to provide interoperability, embodiments of the present invention provide a lightweight proxy mechanism between the source and target virtual machines. The lightweight proxy consists of two primary layers or components. The first component is a shadow object 131, which may reside in the source virtual machine 101. The other component comprises a native class wrapper 132, which may reside in the target virtual machine 102.

The shadow object 131 is an object that serves as a local representation of the foreign object 112. The shadow object 131 is comprised of computer program instructions that can run natively within the source virtual machine 101. Thus, the shadow object 131 effectively implements the desired functions of the foreign object 112. Typically, the shadow object 131 will implement all of the public functions of the foreign object 112. The shadow object 131 also contains computer program instructions that provide the logic to interact with foreign object 112 running in the target virtual machine 102. Although a one-to-one correspondence is shown in FIG. 1, shadow objects do not need to be created on a one-to-one correspondence with foreign objects. For example, shadow objects and foreign objects may have a one-to-many or many-to-one relationship with each other.

The shadow object and native class wrapper can be created either from the source or binary code of the foreign object. In some embodiments, the source code of a foreign object is parsed to create the shadow object and class wrapper. Alternatively, the shadow object and class wrapper can be created by a program that utilizes reflection upon the foreign object.

Reflection is the process by which a computer program can be modified in the process of being executed, in a manner that depends on abstract features of its code and its runtime behavior. Hence, reflection can provide the ability of an object to describe itself and its property. Through the description given by the foreign object of itself, embodiments of the present invention can create a shadow object and class wrapper of the foreign object that correspond with the given description.

The ability to create the shadow object and class wrapper through reflection may be useful as demonstrated by the following example concerning Java Servlets. Java Servlets are Java programs that are deployed on web servers to provide dynamic content. The Servlets are managed by a Java program called a Servlet container. The Servlet container is a Java program running inside a Java Virtual Machine (JVM). The Servlet container invokes Servlets utilizing a standard interface for handling Java Servlets.

Likewise, ASP.NET allows for the execution of .NET applications on a Windows-based web server. The ASP.NET application runs within the .NET runtime on its own virtual machine. Much like Java Servlets, the ASP.NET application provides dynamic content to a web server.

Because of the popularity of Java Servlets and ASP.NET, many companies have written objects and full applications for use within each of these environments. In one embodiment of the invention, a Java Servlet container is modified to interoperate with an ASP.NET application.

In particular, the Java Servlet container is provided an application written for ASP.NET to execute. Utilizing reflection, the Java Servlet container then could automatically create shadow classes and native class wrappers for the objects constituting the ASP.NET application. Once these are created, the Java Servlet container would treat the ASP.NET application in the same way that it treats any Java Servlet.

In the same way, a .NET application could utilize a Java Servlet to provide dynamic web content. The .NET application would create shadow objects to run within the .NET runtime and Java native class wrappers. These objects would invoke the Java Servlet and allow for its content to be provided to the .NET application.

The use of this invention need not only be used in server-based applications. For example, one significant drawback cited against Java is its lack of speed when drawing and implementation of graphical interfaces. This drawback could be addressed by utilizing an implementation of this invention.

In particular, a Java program could be written that utilizes .NET objects to handle the drawing and implementation of graphical interfaces. Shadow objects in the Java virtual machine could be created to represent each of the .NET objects that handle the implementation of the user interface. In addition, native class wrappers of the .NET objects provide the ability for the .NET objects to respond to user events through the use of callbacks back to the Java program.

Unlike prior methods for interoperability, the shadow object 131 does not need to act through a third communication system, such as CORBA, to communicate with the foreign object 112, for example using inter-process communication (IPC). Instead, the shadow object 131 provides for communication initiated from the source virtual machine 101 to the foreign object 112 in the target virtual machine 102. In particular, the shadow object 131 is configured to make local function calls to the foreign object (rather than passing data). For example, the shadow object 131 may utilize one or more libraries that allow it to make function calls to the foreign object 112. Because the direct communication between the shadow object 131 and the foreign object 112 does not need additional communication systems to pass data and other information, this implementation has the ability to be more lightweight and stable than prior methods for interoperability.

The native class wrapper 132 resides in the target virtual machine 102 and comprises computer program instructions that run within the target virtual machine 102. For example, the native class wrapper 132 provides an interface for providing callbacks and other communications with the shadow object 131 running in the source virtual machine 101. In general, a callback allows a running object to notify another object of the occurrence of an event without a specific request for information, e.g., an unsolicited notification.

In order for the source virtual machine 101 to make use of the foreign object 112 running on the target virtual machine 102, the foreign object 112 is provided with the ability to communicate back to the shadow object 131, so that the shadow object 131 can notify the software program 111 even though that event occurred in the target virtual machine 102. The native class wrapper 132 accomplishes this by providing the communication infrastructure to communicate data back from the foreign object 112 in the target virtual machine 102 to the shadow object 131 in the source virtual machine 101. Thus, when the foreign object 112 needs to initiate communication back to the software program 111 running in the source virtual machine 101, the foreign object 112 utilizes the native class wrapper 132. The native class wrapper 132 is configured to communicate directly with shadow object 131 and provide the information from the foreign object 112. The shadow object 131 will then continue the communication to the software program 111.

As also shown in FIG. 1, another feature of the present invention is the ability of the shadow object 131 to determine whether the target virtual machine 102 is currently running and cause the target virtual machine 102 to be loaded if necessary. For example, when the shadow object 131 tries to access the foreign object 112, the shadow object 131 may be configured to first check if the target virtual machine 102 is running.

If the target virtual machine 102 is not running, the shadow object 131 initiates the loading of the target virtual machine 102 by invoking a virtual machine loader 141. The virtual machine loader 141 then loads a foreign object creator 142. Once the target virtual machine 102 is loaded, the foreign object creator 142 creates the foreign object 112 inside the target virtual machine 102.

The foreign object creator 142 is a program running inside the target virtual machine 102 that manages the creation of foreign objects, like foreign object 112, in response to direction by the shadow object 131. In addition, the foreign object creator 142 can manage the reloading of foreign objects if the definition of the foreign object 112 has changed.

In some embodiments, to facilitate performance concerns, the foreign object creator 142 can be paired with a foreign object cache 143. The foreign object cache 143 caches information regarding the foreign object 112. When the foreign object creator 142 needs to determine the definition of the foreign object 112, it may access the foreign object cache 143. One skilled in the art will understand that methods of utilizing a caching system to cache definitions of foreign objects are well known.

If a definition for the foreign object 112 is not yet loaded into the foreign object cache 143 or if the definition of the foreign object 112 has changed, the foreign object creator 142 will initiate the loading or reloading of the foreign object 112. After the target virtual machine 102 is loaded and the foreign object 112 created, the shadow object 131 interacts with the foreign object 112 normally.

Another feature of the present invention is the ability to keep the two systems synchronized even if either of virtual machines 101 and 102 implement automatic garbage collection. As is known to those skilled in the art, garbage collection is the process of freeing memory. Generally this is accomplished by the removal of objects that are no longer in use. Garbage collection of objects utilized by embodiments of this invention may be managed carefully to prevent the collection of objects in one virtual machine without the collection of corresponding objects in the other corresponding virtual machine.

FIG. 2 illustrates the handling of garbage collection of interoperating objects in virtual machines 101 and 102. As shown, virtual machines 101 and 102 implement garbage collection, and thus, may comprise garbage collectors 251 and 252 respectively. If source virtual machine 101 no longer needs the shadow object 131, its garbage collector 251 may mark shadow object 131 for collection.

A finalize function 261 is then called within the shadow object 131. The finalize function 261 is generally called only when an object is going to be destroyed and triggers shadow object 131 to perform various tasks before being removed. In some embodiments, the finalize function 261 may be configured to call the garbage collector 252 in target virtual machine 102 as one of its tasks to begin garbage collection of the foreign object 112.

When garbage collection begins on the foreign object 112, its corresponding finalize function 262 may also be called to provide foreign object 112 an opportunity to perform any tasks before its destruction. After the foreign object 112 finishes executing its finalize function 262, any resulting data may be passed back to the shadow object 131 for return to the software program 111. If the finalize function 262 does not result in any additional data being passed back to the shadow object 231, an indication that the finalize function has finished may also be communicated back to the shadow object 131 in source virtual machine 101. After the finalize function 262 has finished and any additional data has been passed to the shadow object 131 and to the software program 111, garbage collector 251 may then erase the shadow object 131.

The above example only includes one foreign object being garbage collected. One skilled in the art will recognize that the present invention contemplates the need to garbage collect multiple objects as the result of the initiation of collection of one foreign object. For example, a collected foreign object can have members that are objects in the source virtual machine that are accessed through the use of this invention. Because the foreign object might reference other objects in other virtual machines through the use of the invention, the garbage collection of one object could create a cascading effect of garbage collection through multiple virtual machines.

This process may also occur in reverse if the target virtual machine 102 initiates the garbage collection. In this case, the foreign object 112 executes its finalize function 262 and passes any resultant data to the native class wrapper 132. The foreign object 262 is then generally erased.

The native class wrapper 132 may subsequently perform a callback to the shadow object 131 to inform it of the garbage collection of the foreign object 112. The shadow object 131 may then invoke its own garbage collector 251 to garbage collect the shadow object 131. Prior to its erasure, the finalize function 261 may cause the shadow object 231 to pass any data it received during the callback from the native class wrapper 132.

FIG. 3 illustrates the chaining of interoperable objects between virtual machines 301 and 302. As shown, a software program 311 is running in virtual machine 301. Virtual machine 301 is interoperable with virtual machine 302 and desires access to foreign object 321. Foreign object 321 may be a typical object, which can only run in virtual machine 302. As explained above, shadow object 331 and native class wrapper 332 are created and associated with foreign object 321 in virtual machines 301 and 302 respectively.

In addition, embodiments of the present invention allow for "chaining" of interoperable objects. For example, foreign object 321 may also want to access foreign object 322, which exists in virtual machine 301. Accordingly, shadow object 333 and native class wrapper 334 are created in virtual machines 301 and 302 respectively to enable the interoperable use of foreign object 332 by foreign object 321.

According to one aspect of the present invention, the apparatus and method of the present invention, such the source and target virtual machines, operate under control of or are otherwise embodied by computer program products. The computer program products include a computer-readable storage medium, such as the non-volatile storage medium, and computer-readable program instructions, embodied in the computer-readable storage medium. These computer program instructions may be loaded onto a computer or other programmable apparatus to produce a machine, such that the instructions which execute on the computer or other programmable apparatus create means for implementing the functions described above and shown in FIGS. 1-3.

As noted above, these computer program instructions may also be stored in a computer-readable memory that can direct a computer or other programmable apparatus to function in a particular manner, such that the instructions stored in the computer-readable memory produce an article of manufacture including instruction means which implement the above-described functions. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the above-described functions.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer system for providing a source virtual machine that is interoperable with objects in a target virtual machine that is not the source virtual machine, said system comprising:
    a memory containing instructions; and
    a processor, communicatively connected to the memory, that executes the instructions to perform operations comprising:
        implementing the source virtual machine, wherein the source virtual machine runs on a first underlying operating system;
        running a first object, in the source virtual machine, that requests access to a function of a foreign object running in the target virtual machine, wherein the target virtual machine runs on at least one of the first underlying operating system or a second underlying operating system;
        running a shadow object, in the source virtual machine, that is created based on at least one of source code or binary code of the foreign object and configured to respond to the first object and make a local function call directly to the foreign object running in the target virtual machine; and
        running a native class wrapper, in the target virtual machine, that is created based on at least one of the source code or the binary code of the foreign object and configured to provide unsolicited callbacks directly from the foreign object to the shadow object, wherein at least one of the local function call or a callback from the native class wrapper to the shadow object includes garbage collection information.

2. The system of claim 1, wherein the shadow object is configured to provide public functions of the foreign object to the first object.

3. The system of claim 1, wherein the shadow object is configured to make a function call to at least one additional foreign object running in the target virtual machine.

4. The system of claim 1, wherein the shadow object is created based on reflection of the foreign object.

5. The system of claim 1, wherein the first object is a Java object and the foreign object is a .NET object.

6. The system of claim 1, wherein the first object is a .NET object and the foreign object is a Java object.

7. The system of claim 1, wherein the shadow object is configured to send a notification to the foreign object when the shadow object is subjected to garbage collection.

8. The system of claim 1, further comprising at least one additional foreign object that is configured to be interoperable with another object running with another virtual machine.

9. The system of claim 1, further comprising:
    at least one additional foreign object that is configured to be interoperable with another object running within another virtual machine; and
    a second native class wrapper for the at least one additional foreign object that is configured to provide unsolicited callbacks to the another object running within the another virtual machine.

10. A computer system for providing an object running in a target virtual machine that is interoperable with a source virtual machine that is not the target virtual machine requesting access to the object, said system comprising:
    a memory containing instructions; and
    a processor, communicatively connected to the memory, that executes the instructions to perform operations comprising:
        implementing the target virtual machine, wherein the target virtual machine runs on a first underlying operating system;
        running an object, in the target virtual machine, that is configured to respond to a local function call made by a shadow object created based on at least one of source code or binary code of the object, wherein the shadow object is running within the source virtual machine, and wherein the source virtual machine runs on at least one of the first underlying operating system or a second underlying operating system; and
        running a native class wrapper, running within in the target virtual machine, that is created based on at least one of the source code or the binary code of the object and configured to make a direct, unsolicited callback to the shadow object based on an event concerning the object, wherein the local function call or the direct unsolicited callback includes garbage collection information.

11. The computer system of claim 10, the operations further comprising running a virtual machine loader that is responsive to a request by the shadow object to determine whether the target virtual machine is running.

12. The computer system of claim 10, the operations further comprising running an object creator that is configured to create the object called by the shadow object in the target virtual machine.

13. The computer system of claim 10, the operations further comprising running an object creator that is configured to create the object called by the shadow object in the target virtual machine based on information in an object cache.

14. The computer system of claim 10, wherein the native class wrapper is created based on reflection of the object.

15. The computer system of claim 10, wherein the object is a Java object and the native class wrapper is configured to provide an unsolicited callback to a .NET object.

16. The computer system of claim 10, wherein the object is a .NET object and the native class wrapper is configured to provide an unsolicited callback to a Java object.

17. A method of providing interoperability between objects in different virtual machines, said method comprising:
- receiving, from an object running within a source virtual machine running on a first operating system, a request for access to a foreign object running in a target virtual machine running on at least one of the first operating system or a second operating system;
- directly calling, by a shadow object running in the source virtual machine, the foreign object running in the target virtual machine in response to the request, wherein the shadow object was created based on at least one of source code or binary code of the foreign object;
- receiving, by a native class wrapper running in the target virtual machine, data from the foreign object related to the request, wherein the native class wrapper was created based on at least one of the source code or the binary code of the foreign object; and
- directly calling, by the native class wrapper, the shadow object to include garbage collection information associated with the foreign object.

18. The method of claim 17, further comprising:
- determining, by the shadow object, whether the target virtual machine is running; and
- starting a virtual machine loader that loads the target virtual machine when the target virtual machine is not running.

19. The method of claim 17, further comprising determining, by the
- shadow object, whether the target virtual machine is running;
- starting a virtual machine loader that loads the target virtual machine when the target virtual machine is not running; and
- creating the foreign object after the target virtual machine has been loaded.

20. The method of claim 17, further comprising
- determining, by the shadow object, whether the target virtual machine is running;
- starting a virtual machine loader that loads the target virtual machine when the target virtual machine is not running; and
- creating the foreign object based on information in an object cache after the target virtual machine has been loaded.

21. A non-transitory computer-readable storage medium comprising computer executable instructions for performing a method comprising:
- receiving, from an object running within a source virtual machine running on a first operating system, a request for access to a foreign object running in a target virtual machine running on at least one of the first operating system or a second operating system;
- directly calling, by a shadow object running in the source virtual machine, the foreign object running in the target virtual machine in response to the request, wherein the shadow object was created based on at least one of source code or binary code of the foreign object;
- receiving, by a native class wrapper running in the target virtual machine, data from the foreign object related to the request, wherein the native class wrapper was created based on at least one of the source code or the binary code of the foreign object; and
- directly calling, by the native class wrapper, the shadow object to include garbage collection information associated with the foreign object.

22. The non-transitory computer-readable storage medium of claim 21, the method further comprising:
- determining, by the shadow object, whether the target virtual machine is running; and
- starting a virtual machine loader that loads the target virtual machine when the target virtual machine is not running.

* * * * *